United States Patent
Hiramoto et al.

(10) Patent No.: US 7,018,147 B2
(45) Date of Patent: Mar. 28, 2006

(54) ARRANGEMENT STRUCTURE OF MACHINE TOOL

(75) Inventors: Kazuyuki Hiramoto, Yamatokoriyama (JP); Kazutoyo Moriguchi, Yamatokoriyama (JP); Kaoru Yasumatsuya, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 62 days.

(21) Appl. No.: 10/891,457

(22) Filed: Jul. 15, 2004

(65) Prior Publication Data

US 2005/0031425 A1     Feb. 10, 2005

(30) Foreign Application Priority Data

Jul. 15, 2003    (JP)  ............................. 2003-197437

(51) Int. Cl.
    *B23C 1/27*          (2006.01)
(52) U.S. Cl. ........................ 409/134; 409/234; 408/235
(58) Field of Classification Search ................ 409/134, 409/235, 191, 230, 231, 232, 229, 204, 205, 409/183, 145, 137; 408/234, 241 G
See application file for complete search history.

(56) References Cited

U.S. PATENT DOCUMENTS

| | | | | |
|---|---|---|---|---|
| 3,571,834 | A | * | 3/1971 | Mathias ....................... 409/145 |
| 5,368,425 | A | * | 11/1994 | Mills et al. ................. 409/235 |
| 5,439,431 | A | * | 8/1995 | Hessbruggen et al. ...... 409/134 |
| 6,120,222 | A | * | 9/2000 | Hiramoto et al. ........... 409/134 |
| 6,551,038 | B1 | * | 4/2003 | Sugata et al. ............... 409/134 |
| 6,752,750 | B1 | * | 6/2004 | Adachi et al. .............. 409/230 |
| 6,825,630 | B1 | * | 11/2004 | Katoh et al. ................ 409/230 |
| 2001/0041651 | A1 | * | 11/2001 | Abe et al. .................... 409/134 |

FOREIGN PATENT DOCUMENTS

JP          3342820 B      8/2002

* cited by examiner

*Primary Examiner*—Boyer D. Ashley
*Assistant Examiner*—Dana Ross
(74) *Attorney, Agent, or Firm*—Smith Patent Office (57) ABSTRACT

The present invention provides an arrangement structure of a machine tool which is capable of compactly arranging electrical wires and pipes for coolant and the like without impairing support stiffness for a column, and simplifying the arrangement structure, while adopting a column fixing structure. In the present invention, an arrangement structure of a machine tool 1 includes a bed 2, a table 3 arranged on the bed 2 to be movable in a forward and backward (Z axis) direction, a column 4 fixed upright on the bed 2, a saddle 5 arranged on a front surface of the column 4 to be movable in a left and right (X axis) direction, a spindle head 6 arranged on a front surface of the saddle 5 to be movable in an up and down (Y axis) direction, a spindle 6c supported by the spindle head 6 to horizontally face a front side of the machine, a wire supply portion arranged on the column 4 side, and flexible tubes 23a for spindle side electrical wires having flexibility and arranged on a front side of the column 4, the flexible tubes 23a for the spindle side electrical wires connecting the wire supply portion and the spindle head 6.

12 Claims, 6 Drawing Sheets

ARRANGEMENT STRUCTURE OF MACHINE TOOL

BACKGROUND OF THE INVENTION

1. Filed of the Invention

The present invention relates to a machine tool such as a horizontal machining center in which a spindle is supported horizontally by a column which is fixed upright on a bed, and particularly relates to an arrangement structure of electrical wires, pipes of coolant and the like thereof.

2. Discussion of the Related Art

In a machine tool such as the above-mentioned horizontal machining center, it is necessary to connect a fixed side including a bed, a column, and so on and a movable side including a spindle head, a saddle and so on by electrical wires such as power lines of an electrical motor, various signal lines and the like, and various pipes such as supply pipes of coolant, compressed air and the like, oil supply and drain pipes of spindle cooling oil and the like.

Conventionally, as an arrangement structure of such electrical wires and pipes in a horizontal machining center in which a table is arranged on a bed in a Z axis (forward and backward) direction, a column is arranged to be movable in an X axis (left and right) direction, and a spindle head is arranged on the column to be movable in a Y axis (up and down) direction, it is generally adopted a structure in which a bracket is extended from the spindle head to the backside of the column, a movable side relay box is attached to the bracket, and the movable side relay box and the fixed side including a bed and the like are connected by electrical wires and pipes (for example, refer to Japanese Patent No. 3342820).

SUMMARY OF THE INVENTION

In the meantime, the structure in which the column is arranged on the bed to be movable in the X axis direction has a disadvantage in an aspect to increase support stiffness for the column. To increase the support stiffness for the column, it is preferable to fix the column on the bed. When the column is fixedly arranged on the bed, the saddle is arranged on a front surface of the column to be movable in the X axis direction, and the spindle head is arranged on a front surface of the saddle to be movable in the Y axis direction.

When such a column fixing structure is adopted, and when it is attempted to adopt the conventional arrangement structure in which electrical wires and pipes are arranged on the backside of the column as described above, there arises a need to form, in the fixedly arranged column, an opening which corresponds to movable ranges of the above-described bracket and movable side relay box, so that there is a possibility to impair the advantage of increasing the support stiffness for the column as a result.

In view of the above-described conventional situation, an object of the present invention is to provide an arrangement structure of a machine tool which is capable of compactly arranging electrical wires and pipes for coolant and the like without impairing support stiffness for a column, and simplifying the arrangement structure, while adopting the column fixing structure.

In a first invention, an arrangement structure of a machine tool includes a bed, a table arranged on the bed to be movable in a forward and backward (Z axis) direction, a column fixed upright on the bed, a saddle arranged on a front surface of the column to be movable in a left and right (X axis) direction, a spindle head arranged on a front surface of the saddle to be movable in an up and down (Y axis) direction, a spindle supported by the spindle head to horizontally face a front side of the machine, a wire supply portion arranged on the column side, and spindle side electrical wires having flexibility and arranged on a front side of the column, the spindle side electrical wires connecting the wire supply portion and the spindle head.

In the present invention, since the spindle side electrical wires connecting the wire supply portion fixed on the column side and the spindle head are arranged on the front side of the column, the arrangement structure of these wires can be simplified, and moreover, a problem such as decrease of support stiffness for the column will not occur.

Specifically, when a structure to arrange the wires on the backside of the column is adopted for example, it is needed to form in the column an opening corresponding to movable ranges of the saddle and the spindle head, so that there is a possibility that the supporting stiffness for the column decreases as a result, but such an opening is not necessary to be formed in the present invention. Therefore, a problem such as decrease of the supporting stiffness for the column can be avoided.

Further, since the opening of the column can be made small, the size of the saddle can be small, so that the saddle can be made lighter while securing stiffness thereof.

Furthermore, to arrange the wires on the backside of the column, a structure to draw the relay box or the like of the movable side to the backside of the column is needed, so that the structure becomes complicated accordingly, but such a problem does not occur in the present invention.

In one preferred embodiment of the first invention, the arrangement structure of the machine tool further includes saddle side electrical wires having flexibility and arranged on the front side of the column, the saddle side electrical wires connecting the wire supply portion and the saddle.

In the embodiment, since the saddle side electrical wires connecting the wire supply portion and the saddle is also arranged on the front side of the column, decrease of the supporting stiffness for the column and complication of the piping structure can be surely avoided.

In another preferred embodiment of the first invention, the arrangement structure of the machine tool further includes a pipe supply portion arranged on the column side, and spindle side pipes having flexibility and arranged on the front side of the column, the spindle side pipes connecting the pipe supply portion and the spindle head.

In the embodiment, since the various pipes connecting the column side and the spindle head and saddle are also arranged on the front side of the column, decrease of the supporting stiffness for the column and complication of the piping structure can be surely avoided.

In another preferred embodiment of the first invention, the arrangement structure of the machine tool further includes saddle side pipes having flexibility and arranged on the front side of the column, the saddle side pipes connecting the pipe supply portion and the saddle.

In the embodiment, since the various pipes connecting the column side and the spindle head and saddle are also arranged on the front side of the column, decrease of the supporting stiffness for the column and complication of a piping structure can be surely avoided.

In another preferred embodiment of the first invention, the arrangement structure of the machine tool further includes a partition cover which prevents scattering of chips on the column side by covering a movable range of the spindle head, in which the respective electrical wires and the respective pipes are arranged between the partition cover and the column.

In the embodiment, since the electrical wires and the pipes are arranged between the partition cover which covers the movable range of the spindle head and the column, it is possible to avoid falling of chips, coolant and the like on the wires and pipes, so that the durability of the wires and pipes can be improved. Further, it is possible to prevent exposure of the wires and pipes to an operator side, so that deterioration of appearance due to arrangement on the front side of the column can be avoided.

In another preferred embodiment of the first invention, the arrangement structure of the machine tool further includes a spindle opening formed in the saddle to allow movement of a rear end portion of the spindle in the Y axis direction, and a maintenance opening formed in the column to face the spindle opening.

In the embodiment, since the maintenance opening is formed in the column to face the spindle opening of the saddle which allows movement of the rear end portion of the spindle in the Y axis direction, inspection and maintenance of the spindle from the backside thereof can be easily and surely performed, so that the maintainability thereof can be improved.

BRIEF DESCRIPTION OF THE DRAWINGS

The configuration and the operation and effect of the present invention will be described in detail in an embodiment based on the following attached drawings.

DETAILED DESCRIPTION OF THE PREFERRED EMBODIMENTS

Hereinafter, an embodiment of the present invention will be described based on the attached drawings.

Figure 1:
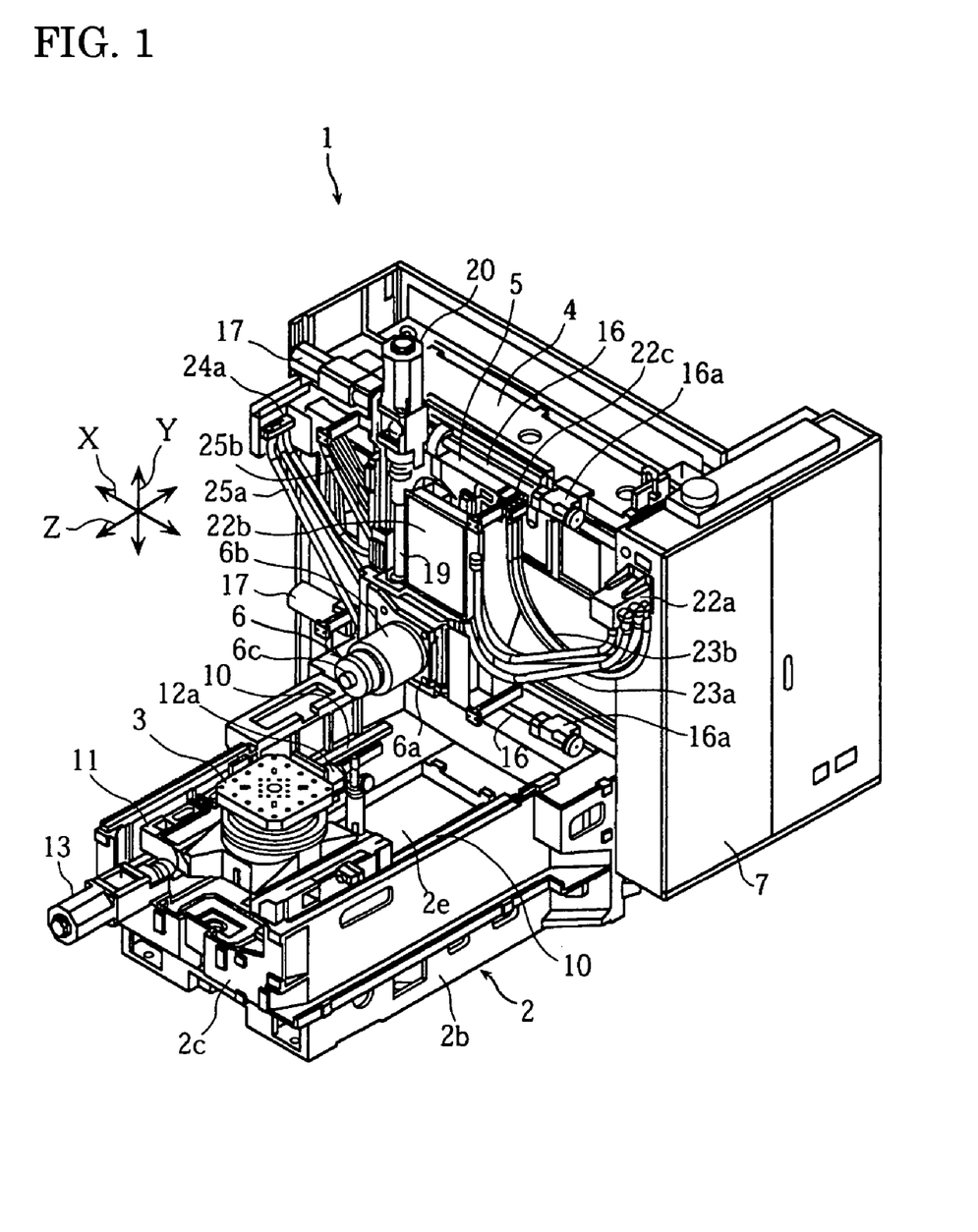
FIG. 1 is a perspective front view of a horizontal machining center according to one embodiment of the present invention.
Figure 2:
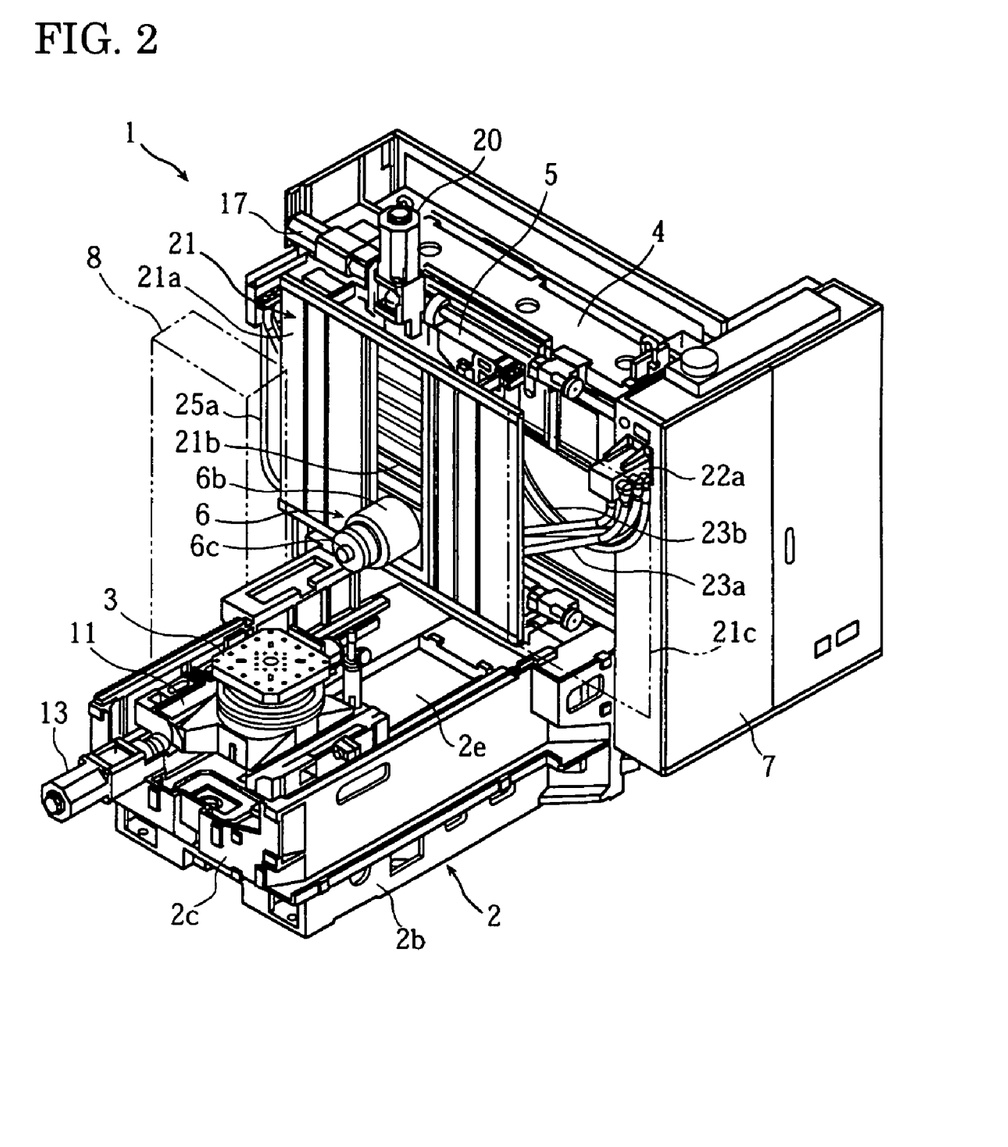
FIG. 2 is a perspective front view of the horizontal machining center.
Figure 3:
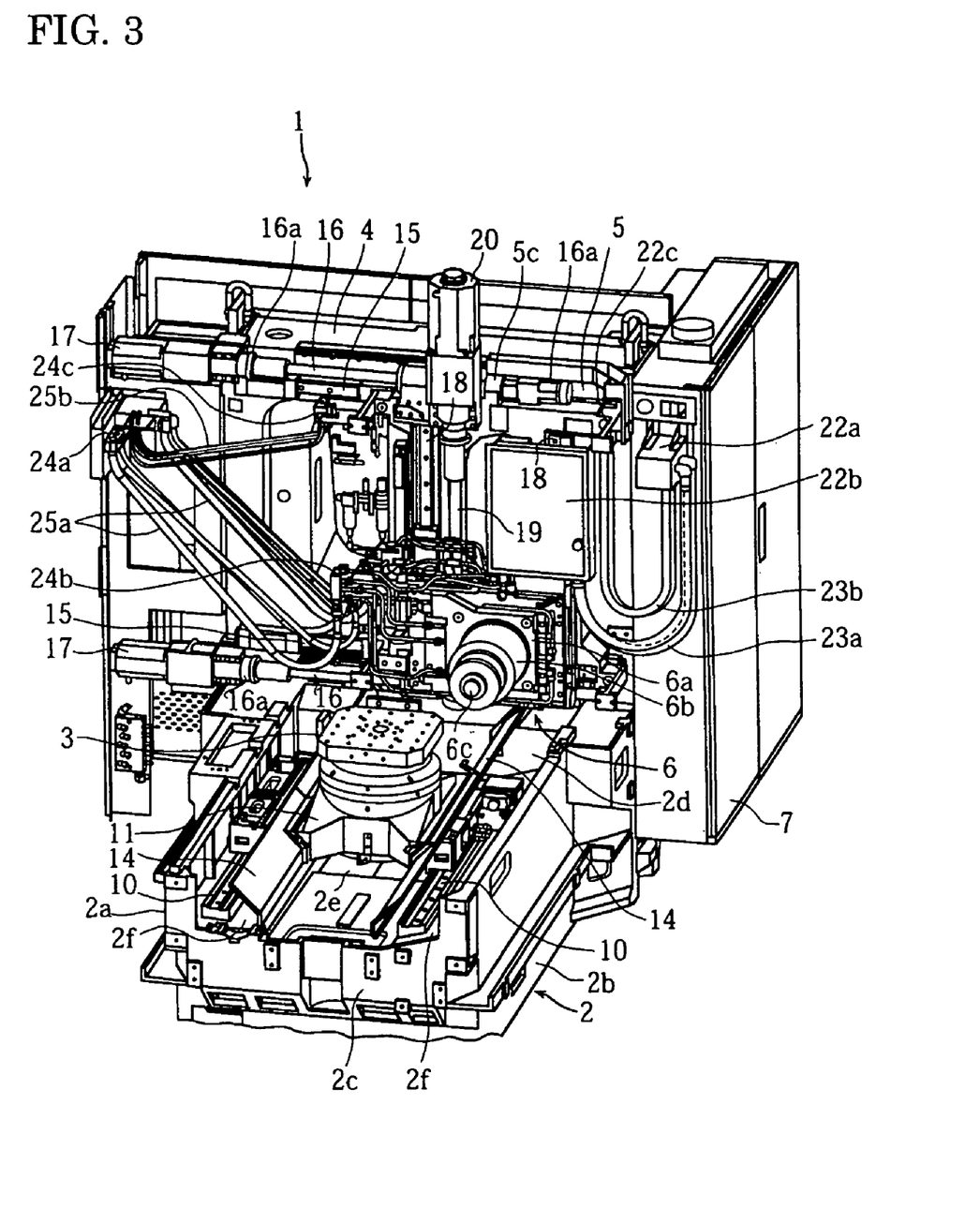
FIG. 3 is a perspective front view showing an arrangement structure of the horizontal machining center.
Figure 4:
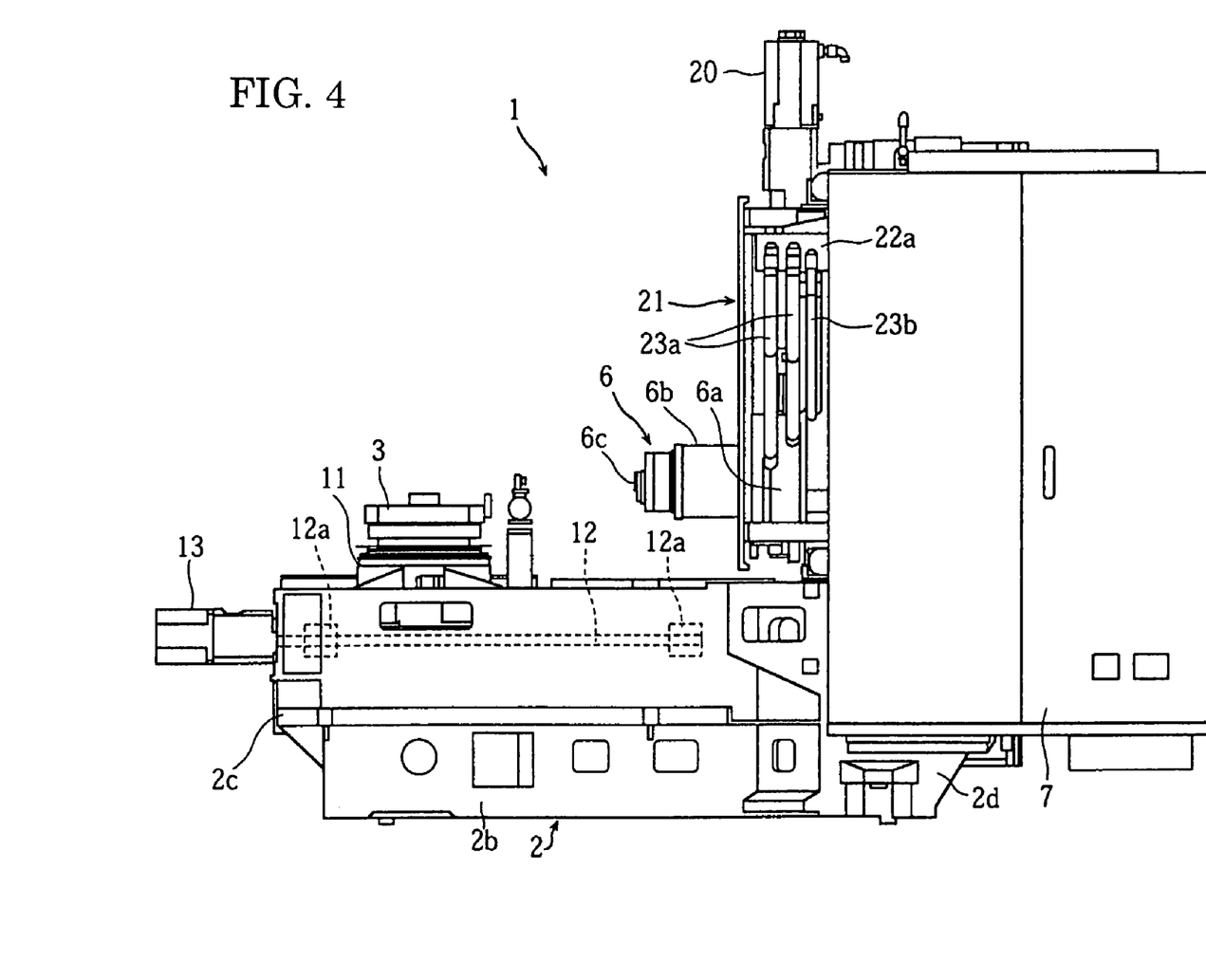
FIG. 4 is a right side view of the horizontal machining center.
Figure 5:
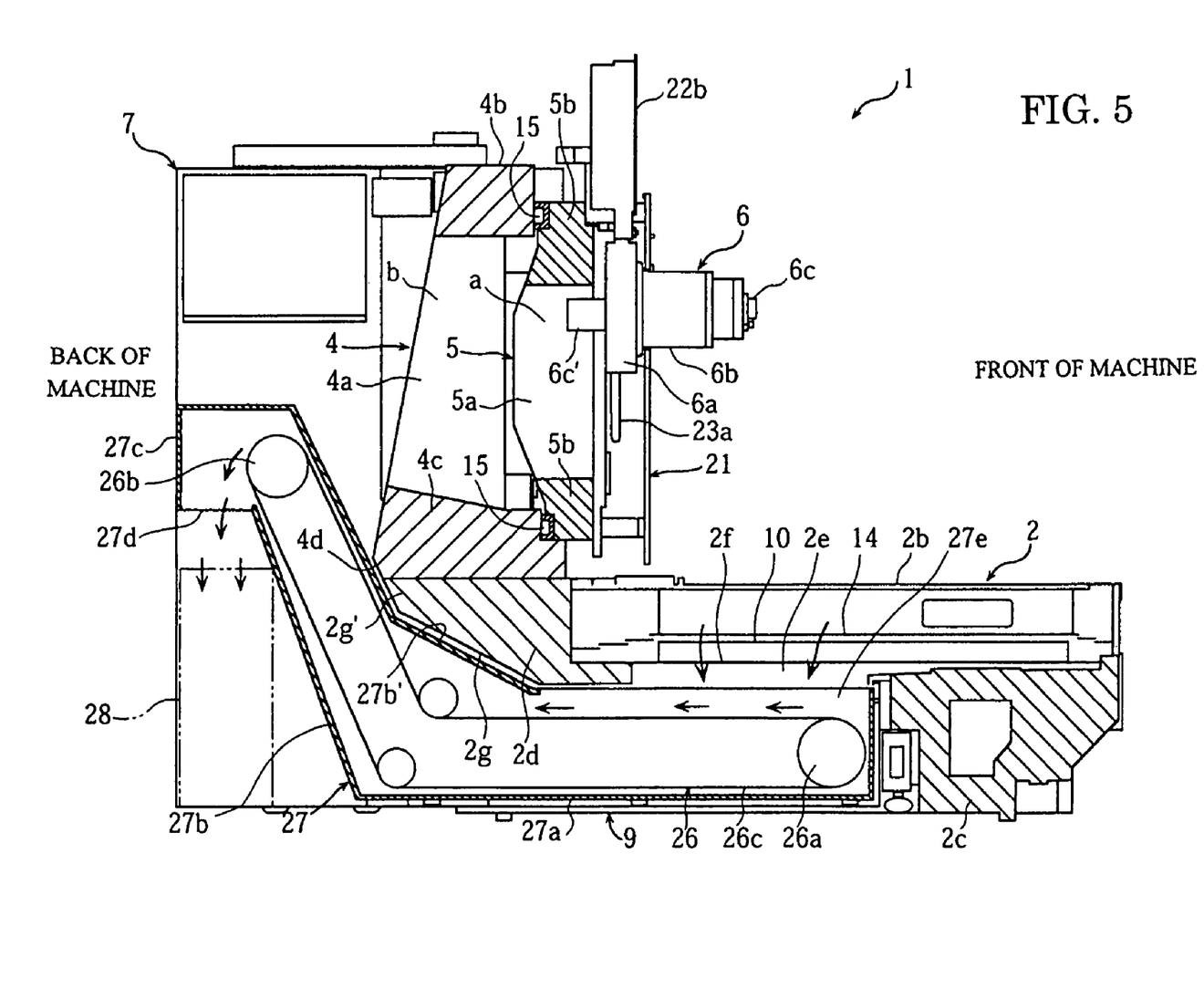
FIG. 5 is a cross-sectional left side view of the horizontal machining center.
Figure 6:
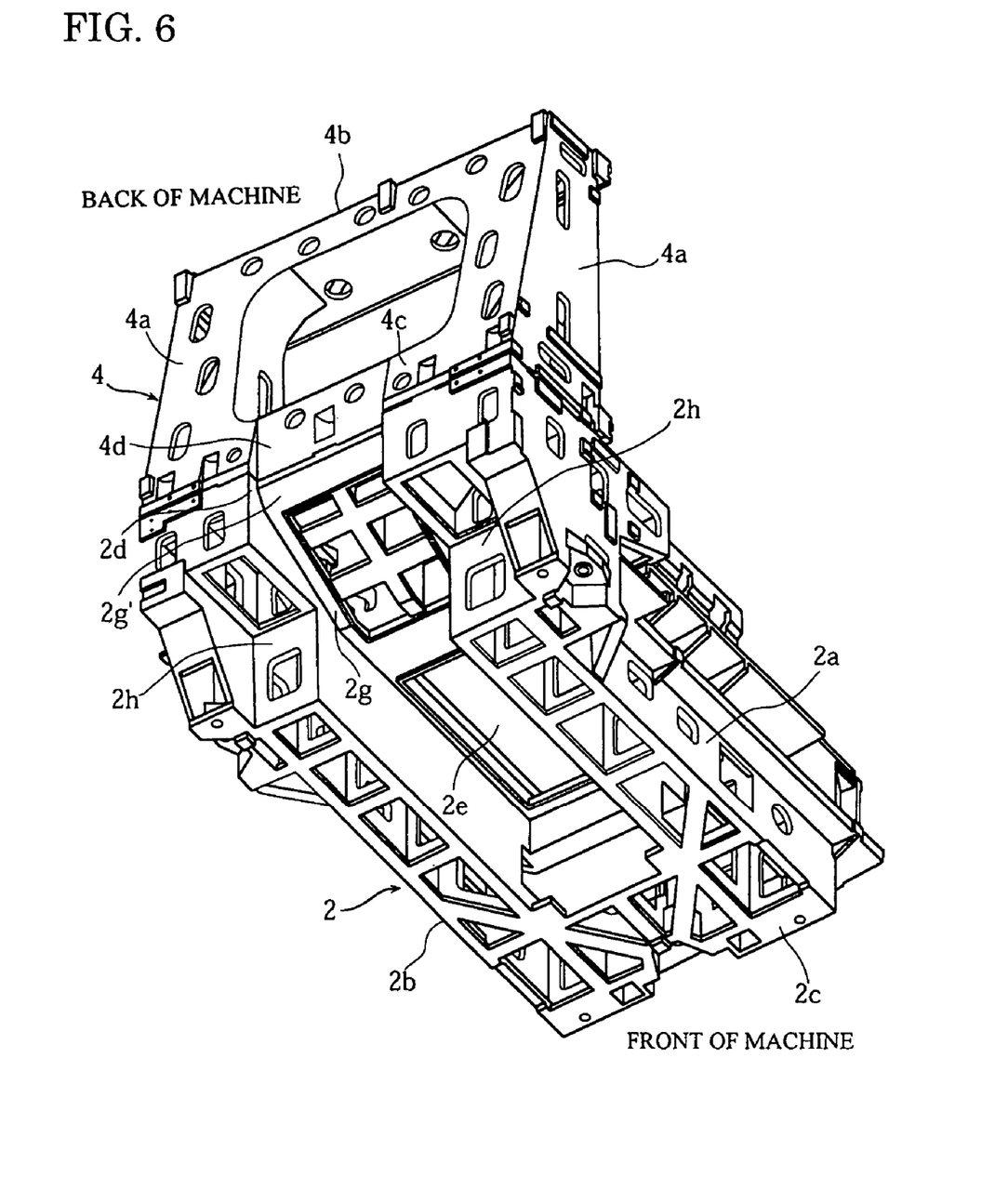
FIG. 6 is a perspective bottom view of a bed and a column of the horizontal machining center.

FIG. 1 to FIG. 6 are views for describing an arrangement structure of a horizontal machining center according to one embodiment of the present invention, FIG. 1 and FIG. 2 are perspective front views of the horizontal machining center, FIG. 3 is a perspective front view showing the arrangement structure, FIG. 4 and FIG. 5 are a right side view and a cross-sectional left side view of the horizontal machining center respectively, and FIG. 6 is a perspective view of a bed and a column seen from a bottom surface. Incidentally, in this specification, front/rear and left/right mean front/rear and left/right seen from the front of the machine.

In the figures, a numeral 1 denotes a horizontal machining center. This horizontal machining center 1 has a schematic structure as follows. A bed 2 has a substantially rectangular frame shape in a plan view. On an upper surface of the bed 2, a table 3 is arranged to be movable in a Z axis (forward and backward) direction, and on a rear end portion of the upper surface of the bed 2, a column 4 is fixedly arranged. On a front surface of the column 4, a saddle 5 is arranged to be movable in an X axis (left and right) direction, and on the saddle 5, a spindle head 6 is arranged to be movable in a Y axis (up and down) direction. Furthermore, on a right side surface of a rear end portion of the bed 2, a control board 7 is arranged, and on a left side surface of a front portion thereof, an automatic tool changer 8 is arranged. Moreover, inside a rectangular frame of the bed 2, a chip discharging device 9 which discharges chips to the backside of the machine is arranged.

The bed 2 is made by casting and formed in a rectangular frame shape, and has an opening 2e in a rectangular shape in a plan view, which has left and right side wall portions 2a and 2b each in a cylindrical shape extending in a forward and backward direction, a front wall portion 2c connecting front portions of both the side wall portions 2a and 2b with each other, and a rear wall portion 2d which connects rear portions thereof with each other.

The front wall portion 2c of the bed 2 has the same height of a bottom surface as those of the left and right side wall portions 2a and 2b, while the rear wall portion 2d is arranged to deviate upward, and a space for arranging the chip discharging device 9 is formed between the rear wall portion 2d and a floor surface. Furthermore, on a bottom portion of the rear wall portion 2d, an inclined surface 2g is formed to obliquely rise upward by cutting out and removing a rear portion of the bottom portion, and a rear end portion of the inclined surface 2g is an inclined surface 2g' having a larger angle of inclination. Then, on a rear end portion of a lower end surface of the column 4, an inclined surface 4d continuous to the inclined surface 2g' is formed. Incidentally, the inclined surfaces 2g, 2g', and 4d are set to have substantially the same width as a length between internal surfaces of the left and right side walls 2a and 2b of the bed 2, that is, a width corresponding to the chip discharging device 9.

Further, on rear end portions of the left and right side wall portions 2a and 2b of the bed 2, cut-out portions 2h are formed, and by the cut-out portions 2h, spaces substantially continuous to a space beneath the rear wall portion 2d and to a space formed by the inclined surface 2g are formed.

On an upper surfaces of the left and right side wall portions 2a and 2b of the bed 2, support surfaces 2f are formed so as to step down to the opening 2e side. On the support surfaces 2f, table guide rails 10 and 10 extending in a forward and backward direction are arranged. On the table guide rails 10 and 10, a table support 11 is mounted to be freely movable in the Z axis (forward and backward) direction, and the above-described table 3 is mounted on the table support 11.

A nut member (not-shown) is arranged on a left end of a bottom surface of the table support 11, and a table ball screw 12 for driving the table is screwed into the nut member. This table ball screw 12 is arranged in parallel to the Z axis, and a front end portion and a rear end portion thereof are pivotally supported by bearings 12a and 12a arranged on the support surfaces 2f on the bed 2. On the front end portion of the table ball screw 12, a table motor 13 for driving the table is connected, and by rotationally driving the table ball screw 12 by the table motor 13, the table support 11 and further the table 3 move in the Z axis direction on the bed 2.

The left and right table guide rails 10 and 10 and the table ball screw 12 are covered with Z axis chip covers 14 each made of a metal sheet and arranged on an upper side thereof. These Z axis chip covers 14 are for preventing chips from falling on the table guide rails 10 and the table ball screw 12.

These Z axis chip covers 14 are inclined inward to allow the chips to fall toward the opening 2e of the bed 2, and move along with movement of the table support 11 in the Z axis direction.

The column 4 is in a rectangular frame shape which has, when seen from the front, left and right side portions 4a and 4a, an upper side portion 4b connecting upper end portions of both the side portions with each other, and a lower side portion 4c connecting lower end portions thereof with each other. The left and right side portions 4a are each formed in a columnar shape which has a front surface which stands perpendicularly and a back surface which inclines such that an upper side thereof is located more forward than a lower side thereof, when seen from a side.

On front surfaces of the upper side portion 4b and the lower side portion 4c, upper and lower saddle guide rails 15 and 15 extending in the X axis direction are arranged horizontally. By these saddle guide rails 15 and 15, the saddle 5 is supported to be freely movable in the X axis direction.

The saddle 5 is in a substantially rectangular frame shape which has left and right side portions 5a and 5a and upper and lower side portions 5b and 5b. On an upper edge and a lower edge of the saddle 5, nut members 5c are arranged, and saddle ball screws 16 and 16 for driving the saddle are screwed into the upper and lower nut members 5c. These saddle ball screws 16 are pivotally supported at their front and rear end portions by bearings 16a arranged on a front surface of the column 5, and on left end portions of the upper and lower saddle ball screws 16, saddle motors 17 for driving the saddle are connected. By rotationally driving the saddle ball screws 16 by the saddle motors 17, the saddle 5 and further the spindle head 6 move in the X axis (left and right) direction.

On a front surface of the saddle 5, a pair of left and right spindle guide rails 18 and 18 extending in the Y axis direction are arranged and fixed perpendicularly. By these left and right spindle guide rails 18 and 18, the spindle head 6 is supported to be freely movable in the Y axis direction. This spindle head 6 has a spindle base 6a in a rectangular plate shape and a spindle support 6b which is fixed on the spindle base 6a to extend in a horizontal direction and supports a spindle 6c facing a front side in a horizontal direction.

A nut member is arranged on a back surface of a left side portion of the spindle base 6a, and a spindle ball screw 19 for feeding the spindle is screwed into the nut member. Upper and lower end portions of this spindle ball screw 19 are pivotally supported by bearings fixed on the saddle 5, and on an upper end portion of the spindle ball screw 19, a spindle feed motor 20 for feeding the spindle is connected. Incidentally, the spindle 6c supported by the spindle head 6 is rotationally driven by a built-in motor for driving the spindle. A cooling jacket is formed on the spindle 6c, particularly on a bearing portion thereof, and cooling oil is supplied to the cooling jacket as will be described later.

Here, a rear end portion 6c' of the spindle 6c moves in the Y axis direction inside a spindle opening "a" formed by the upper/lower and left/right side portions of the saddle 5, and faces backward through a maintenance opening "b" formed by the left and right side portions and the upper and lower side portions of the column 4. Specifically, inspection and maintenance around the rear end portion 6c' of the spindle 6c can be performed through the opening "a" and "b" formed on the column 4 and the saddle 5, so that the maintainability thereof is improved.

Further, the spindle head 6 has a partition cover 21 for preventing chips and the like from falling on the saddle guide rails 15, the spindle guide rails 18, the saddle ball screws 16, the spindle ball screw 19, and so on. This partition cover 21 has an X axis cover portion 21a fixed and supported on the saddle 5 and moving with the spindle head 6 in the X axis direction, and a Y axis cover portion 21b moving with the spindle head base 6a in the Y axis direction.

Incidentally, the X axis cover portion 21a is formed in a flat plate shape which does not expand or contract, and the Y axis cover portion 21b is formed as a telescopic type which expands and contracts. A left edge portion of the X axis cover portion 21a is configured to enter a back surface of the automatic tool changer 8, and a right edge portion thereof is configured to enter a back surface of a cover 21c arranged and fixed on a front side of the control board 7. Thus, even when the partition cover 21 moves in the X axis direction along with movement of the saddle 5, no gap will be formed on the left and right sides of the partition cover 21.

The control board 7 is in a rectangular box shape and attached to a right side wall rear portion of the bed 2. On an upper end portion of a front surface of this control board, a fixed side relay box 22a as a fixed side wire supply portion is attached.

Further, above the right side of the spindle base 6a, a spindle side terminal box 22b as a spindle side wiring relay portion is attached. Inside this spindle side terminal box 22b, power supply terminals, various signal terminals, and the like are arranged, and these respective terminals are connected to the built-in motor for driving the spindle, sensors and the like.

The fixed side relay box 22a and the spindle side terminal box 22b are connected by flexible tubes 23a which accommodate spindle side electrical wires, and the spindle side electrical wires from respective devices of the control board 7 are connected via the fixed side relay box 22a and through the flexible tubes 23a to respective terminals inside the spindle side terminal box 22b.

Furthermore, saddle side electrical wires from the control board 7 are connected from the fixed side relay box 22a through flexible tubes 23b to the spindle feed motor 20 for driving the spindle ball screw 19, sensors and the like. Incidentally, 22c is a block for fixing the flexible tubes 23b on the saddle 5.

The respective electrical wires and the flexible tubes 23a and 23b which accommodate and protect the respective electrical wires have flexibility to bend easily as a whole, and are set to have lengths and bending forms corresponding to a movable range of the spindle base 6a and a movable range of the saddle 5.

Here, the flexible tubes 23a for the spindle side electrical wires are arranged to be located between the partition wall cover 21 and the front surface of the saddle 5, and the flexible tubes 23b for the saddle side electrical wires are arranged to be located between the partition cover 21 and the front surface of the column 4.

On a left side wall portion of the column 4, there is fixed a fixed side joint 24a which has supply ports of coolant, lubricant oil, compressed air and the like, and oil supply and drain ports of cooling oil and the like, and functions as a pipe supply portion. Incidentally, although not shown, supply sources of coolant, lubricant oil, compressed air and the like and a supply source of cooling oil and the like are connected to an inlet of the fixed side joint 24a.

Further, on a left side portion of the spindle base 6a, there is attached a spindle side relay joint 24b which has relay ports of coolant, lubricant oil, compressed air and the like, and oil supply and drain relay ports of cooling oil, and the like, and functions as a spindle side pipe relay portion. Incidentally, an outlet of the spindle side relay joint 24b is connected to a coolant discharge port, lubricated portions, an air cylinder, the above-described cooling jacket, and the like of the spindle head 6 by distribution pipes and the like. Furthermore, on the saddle 5, a saddle side relay joint 24c which has a relay port of lubricant oil and the like and functions as a saddle side pipe relay portion is attached, and an outlet of the saddle side relay joint 24c is connected by distribution pipes to lubricated portions of the saddle 5 side.

Then, an outlet of the fixed side joint 24a and inlets of the spindle side relay joint 24b and the saddle side relay joint 24c are communicatively connected by spindle side utility pipes 25a and saddle side utility pipes 25b, respectively. As the respective utility pipes 25a and 25b, adopted are so-called flexible tubes having flexibility to bend easily, and they are set to have lengths and bending forms corresponding to the movable range of the spindle base 6a and the movable range of the saddle 5.

Here, the spindle side utility pipes 25a are arranged to be located between the partition cover 21 and the front surface of the saddle 5, and the saddle side utility pipes 25b are arranged to be located between the partition cover 21 and the front surface of the column 4.

The chip discharging device 9 has a conveyor 26 which carries chips to the backside of the column 4 and a storage box 27 which accommodates the conveyor 26 and stores chips, coolant and the like which fall out from the conveyor 26.

The storage box 27 is in a shape which extends from a lower side of the opening 2e of the bed 2 through a space beneath the rear wall portion 2d to the backside of the column 4, and there stands up obliquely upward to be substantially in contact with the inclined surfaces 2g, 2g', and 4d. Specifically, the storage box 27 has a storage portion 27a which stores chips, coolant and the like via a collecting port 27e, an inclined portion 27b which stands up obliquely along the aforementioned inclined surfaces, and a discharge portion 27c which drops the chips through a discharge port 27d into a container 28 such as a drum arranged therebelow.

The conveyor 26 is structured such that a belt 26c constituted by a large number of metal plates in a band plate shape being connected together is wound around driving pulleys 26a and 26b, and is formed in a shape that extends along the shape of the storage box 27 from under the opening 2e to the backside of the machine and stands up obliquely upward along the aforementioned inclined surfaces.

In the horizontal machining center 1 of this embodiment, a work is machined by a tool fitted to the spindle 6c while moving the table 3 to which the work is fixed in the Z axis direction, the saddle 5 in the X axis direction, and the spindle head 6 in the Y axis direction, respectively. In this machining of a work, the flexible tubes 23a and 23b which accommodate electrical wires and the utility pipes 25a and 25b transform, along with the movement of the saddle 5 and the spindle head 6, between a state hanging down with a small radius of bending and a state stretched in both directions so as to draw an arc with a large radius in a space between the partition cover 21 and the saddle 5 or the column 4, so that the moving amount is absorbed.

Thus, in this embodiment, since the column 4 is fixed and arranged on the bed 2, and the flexible tubes 23a and 23b for various electrical wires and the utility pipes 25a and 25b which connect the fixing side and the moving side are arranged on the front side of the column 4, these arrangement structure can be simplified, and decrease of supporting stiffness for the column can be avoided.

Specifically, when a structure to arrange the wires and pipes on the backside of the column is adopted for example, there arises a need to form in the column an opening which corresponds to movable ranges of the saddle and the spindle head, so that there is a possibility that the supporting stiffness for the column decreases as a result, and also a structure for drawing the relay box or the like to the backside of the column is needed, but such problems do not occur in this embodiment.

Further, in this embodiment, since the flexible tubes 23a and 23b for respective electrical wires and the utility pipes 25a and 25b are arranged between the partition cover 21 and the column 4, it is possible to avoid falling of the coolant and chips on these wires and pipes, so that the durability of the wires and pipes can be improved. Further, the electrical wires and the utility pipes cannot be seen from an operator side, so that deterioration of appearance due to arrangement on the front side of the column can be avoided.

Further, in this embodiment, to provide the chip discharging device 9 at a center bottom portion of the bed 2, the inclined surfaces 2g and 2g' are formed on the rear wall portion 2d of the bed 2, the inclined surface 4d is formed on a rear end portion of a lower surface of the column 4, and furthermore the chip discharging device 9 is raised so that a ceiling wall 27b' of the inclined portion 27b is substantially in contact with the inclined surfaces. Consequently, a protruding amount of the chip discharging device 9 toward the backside of the machine can be minimized, so that the entire machine can be made smaller to thereby reduce an install space thereof.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. An arrangement structure of a machine tool, comprising:
    a bed;
    a table arranged on said bed to be movable in a forward and backward (Z axis) direction;
    a column fixed upright on said bed;
    a saddle arranged on a front surface of said column to be movable in a left and right (X axis) direction;
    a spindle head arranged on a front surface of said saddle to be movable in an up and down (Y axis) direction;
    a spindle supported by said spindle head to horizontally face a front side of the machine;
    a wire supply portion arranged on said column side; and
    spindle side electrical wires having flexibility and arranged on a front side of said column, said spindle side electrical wires connecting said wire supply portion and said spindle head.

2. The arrangement structure of the machine tool according to claim 1, further comprising saddle side electrical wires having flexibility and arranged on the front side of said column, said saddle side electrical wires connecting said wire supply portion and said saddle.

3. The arrangement structure of the machine tool according to claim 2, further comprising:

a pipe supply portion arranged on said column side; and spindle side pipes having flexibility and arranged on the front side of said column, said spindle side pipes connecting said pipe supply portion and said spindle head.

4. The arrangement structure of the machine tool according to claim 3, further comprising a partition cover which prevents scattering of chips on said column side by covering a movable range of said spindle head, wherein said respective electrical wires and said respective pipes are arranged between said partition cover and said column.

5. The arrangement structure of the machine tool according to claim 2, further comprising saddle side pipes having flexibility and arranged on the front side of said column, said saddle side pipes connecting said pipe supply portion and said saddle.

6. The arrangement structure of the machine tool according to claim 5, further comprising a partition cover which prevents scattering of chips on said column side by covering a movable range of said spindle head, wherein said respective electrical wires and said respective pipes are arranged between said partition cover and said column.

7. The arrangement structure of the machine tool according to claim 2, further comprising:

a spindle opening formed in said saddle to allow movement of a rear end portion of said spindle in the Y axis direction; and a maintenance opening formed in said column to face said spindle opening.

8. The arrangement structure of the machine tool according to claim 1, further comprising:

a pipe supply portion arranged on said column side; and spindle side pipes having flexibility and arranged on the front side of said column, said spindle side pipes connecting said pipe supply portion and said spindle head.

9. The arrangement structure of the machine tool according to claim 8, further comprising a partition cover which prevents scattering of chips on said column side by covering a movable range of said spindle head, wherein said respective electrical wires and said respective pipes are arranged between said partition cover and said column.

10. The arrangement structure of the machine tool according to claim 1, further comprising saddle side pipes having flexibility and arranged on the front side of said column, said saddle side pipes connecting said pipe supply portion and said saddle.

11. The arrangement structure of the machine tool according to claim 10, further comprising a partition cover which prevents scattering of chips on said column side by covering a movable range of said spindle head, wherein said respective electrical wires and said respective pipes are arranged between said partition cover and said column.

12. The arrangement structure of the machine tool according to claim 1, further comprising:

a spindle opening formed in said saddle to allow movement of a rear end portion of said spindle in the Y axis direction; and a maintenance opening formed in said column to face said spindle opening.

* * * * *